No. 761,957. Patented June 7, 1904.

UNITED STATES PATENT OFFICE.

WILBUR S. GOULD, OF DEEPRIVER, IOWA, ASSIGNOR OF ONE-HALF TO
F. W. HARWOOD, OF CEDAR RAPIDS, IOWA.

PROCESS OF RENOVATING CREAM.

SPECIFICATION forming part of Letters Patent No. 761,957, dated June 7, 1904.

Application filed February 1, 1904. Serial No. 191,583. (No specimens.)

*To all whom it may concern:*

Be it known that I, WILBUR S. GOULD, a citizen of the United States, residing at Deepriver, in the county of Poweshiek and State of Iowa, have invented certain new and useful Improvements in Processes of Renovating Cream, of which the following is a specification.

This invention has for its object to rectify or renovate sour cream and produce from it in admixture with sweet milk rich in cream a sweet and palatable product having all the essential characteristics of cream that has never soured.

As a result of a series of experiments I have discovered that it is possible without churning to separate the fatty and valuable elements from sour cream in a sweet and palatable state, leaving behind the sour and unwholesome elements. By now mixing this agreeable butter-fat with sweet milk the product has the flavor and almost the consistency of new cream. It is only necessary to separate the sweet milk partially, thus combining the butter-fat with a milk rich in cream to produce a cream equal in every respect to originally sweet cream.

The process by which this result is attained is described as follows:

The sour cream is first diluted and pasteurized and practically at the same time separated by flowing through a milk-separator. In this operation cream and hot water (at a pasteurizing temperature of about 160°) in about the proportion of one part cream to four of water are flowed into the separator in a single stream. An emulsion of butter-fat and water flows out, leaving the residuum in the separator-bowl.

The next step in the process is to separate the water from the butter-fat. This is done in a milk-separator and in the same way as cream is commonly separated from "skimmed" milk.

In the final step of the process the separated butter-fat is combined with sweet milk in such proportion as may be desired. This is also done in a separator, and at the same time it is desirable to enrich the product by separating out a part of the milk, (skimmed milk,) so that the butter-fat is emulsified with a sweet milk rich in cream. When so treated, the resulting product has the flavor, delicacy, nutrition, and keeping qualities of fresh cream.

I claim—

The herein-described method of renovating sour cream, which consists in diluting it with water at a pasteurizing temperature, separating the emulsified butter-fat and water from the other constituents, separating the butter-fat from the water, and finally emulsifying said butter-fat with rich, fresh milk, substantially as set forth.

In testimony whereof I affix my signature in presence of two witnesses.

WILBUR S. GOULD.

Witnesses:
J. M. ST. JOHN,
ROBT. ZOLLINGER.